United States Patent [19]

Bube et al.

[11] Patent Number: 4,504,732
[45] Date of Patent: Mar. 12, 1985

[54] SIMULATIVE TEMPERATURE CONTROLLER FOR A MOTOR VEHICLE

[75] Inventors: Carsten Bube, Ludwigsburg; Gerd Thiele, Stuttgart; Hans Zeller, Grafenau, all of Fed. Rep. of Germany

[73] Assignee: Robert Bosch GmbH, Stuttgart, Fed. Rep. of Germany

[21] Appl. No.: 570,441

[22] Filed: Jan. 16, 1984

Related U.S. Application Data

[63] Continuation of Ser. No. 350,548, Feb. 19, 1982, , which is a continuation of Ser. No. 128,765, Mar. 10, 1980, Pat. No. 4,348,583, which is a continuation of Ser. No. 898,758, Apr. 20, 1978, abandoned.

[30] Foreign Application Priority Data

Jun. 11, 1977 [DE] Fed. Rep. of Germany ....... 2726458

[51] Int. Cl.³ .............................................. H05B 1/02
[52] U.S. Cl. .................................. 219/497; 219/205; 219/202; 219/501; 123/179 H
[58] Field of Search ............... 219/202, 205, 490, 492, 219/493, 494, 497, 501, 507–510, 216; 123/179 H, 179 BG; 323/242, 326, 370; 340/582, 515

[56] References Cited

U.S. PATENT DOCUMENTS

| | | | |
|---|---|---|---|
| 3,794,808 | 2/1974 | Takagi | 219/497 |
| 3,881,085 | 4/1975 | Traister | 219/499 |
| 3,944,893 | 3/1976 | Hayden | 219/492 |
| 3,973,140 | 8/1976 | Phillips | 219/492 |
| 4,072,997 | 2/1978 | Boothman et al. | 219/497 |
| 4,106,465 | 8/1978 | Bernhardt et al. | 123/179 H |
| 4,130,853 | 12/1978 | Baker | 219/492 |

FOREIGN PATENT DOCUMENTS

2446590 4/1976 Fed. Rep. of Germany ...... 323/243

OTHER PUBLICATIONS

IBM Technical Disclosure, vol. 16, number 9, 2–1974, "Complete Half-Wave Thyristor Control".

*Primary Examiner*—M. H. Paschall
*Attorney, Agent, or Firm*—Edwin E. Greigg

[57] ABSTRACT

A heating device for use in motor vehicles to rapidly heat combustion chambers, exhaust gas sensors, catalyzers and other associated apparatus. A resistive heating element is connected in series with a low-impedance measuring resistor and a switch across a power source, while a resistance bridge is formed with the aid of two further resistors. The diagonal bridge voltages are compared in a comparator whose output actuates a control circuit which operates the heater switch. The heater switch also provides the power for the comparator. In a first interval, constant current is applied to the heating element, while the current is pulsed during a second time interval. The switch control pulses may be provided by a free-running oscillator or one whose pulses are synchronized with the undulations of the engine starter current.

7 Claims, 7 Drawing Figures

SIMULATIVE TEMPERATURE CONTROLLER FOR A MOTOR VEHICLE

This is a continuation of application Ser. No. 350,548 filed Feb. 19, 1982, which is a continuation of Ser. No. 128,765 filed Mar. 10, 1980, now U.S. Pat. No. 4,348,583, which is a continuation of Ser. No. 898,758, filed Apr. 20, 1978, now abandoned.

Cross-reference is made to the U.S. patent application, Ser. No. 166,925, of Bube et al, filed Apr. 7, 1980, describing a safety device for an electric consumer in a motor vehicle which includes a temperature simulating circuit similar to the temperature simulating circuit described herein.

BACKGROUND OF THE INVENTION

The invention relates to the field of motor vehicles. More particularly, the invention relates to apparatus for providing rapid heating of portions of the engine or of its associated elements, such as the exhaust gas catalyzer. In a known electrical heater of this type, a heating element is connected in series with a bimetallic switch and a resistor. At the beginning of the heating cycle, the resistor is short-circuited and is later introduced into the circuit when the bimetallic switch has responded to the ambient temperature. It is a particular disadvantage of the known heating apparatus that high power is required even in the secondary heating period. Furthermore, the known apparatus provides no practical way to change the heating power generated during the second heating period.

OBJECT AND SUMMARY OF THE INVENTION

It is thus a principal object of the present invention to provide an electrical heating apparatus for heating various elements of an engine or accessory equipment in a motor vehicle. It is a further principal object of the invention to provide a heating apparatus in which the power used by the heater is reduced during a second heating interval. Yet another object of the invention is that the average heating energy during a second heating interval can be controlled with relative ease. Yet another object of the invention is a heating apparatus in which the temperature of the heating element can be adapted to the requirements of the engine during starting and warm-up without regard to the voltage supplied by the vehicle battery.

These and other objects are attained according to the present invention by providing a heating apparatus in which a heating element receives a predetermined amount of power during a first timing interval and wherein, during a second and consecutive timing interval, the heating current is delivered to the heater as a series of pulses.

It is a further object of the invention to so deliver power to the heater during the second heating interval that the total current supplied by the battery is reduced and the load on the battery is thus reduced during that time. This object is attained by synchronizing the power pulses delivered to the heater in the second heating interval with the decreases of the starter current of the engine. The duration of the first heating interval may be determined in a variety of ways. According to the present invention it has been shown to be particularly advantageous if the effective resistance of the heating element is measured, for example in a resistance bridge. However, the heating process may also be electrically simulated.

The heating device according to the present invention may also be used to serve as a glow heater in self-ignited engines, and it may find use as a heater for heating exhaust gas detectors which are known to require a relatively elevated temperature for correct functioning.

The invention will be better understood as well as further objects and advantages thereof become more apparent from the ensuing detailed description of a number of preferred embodiments taken in conjunction with the drawing.

DESCRIPTION OF THE PREFERRED EMBODIMENTS

Figure 1:
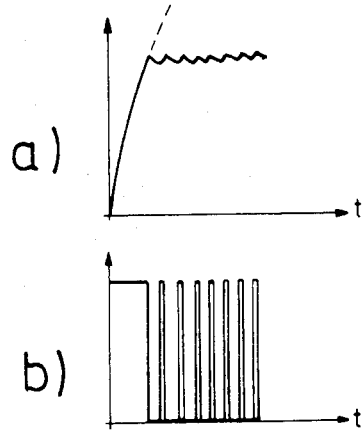
FIG. 1 is a set of diagrams illustrating in FIG. 1a the temperature of the heating element as a function of time and in FIG. 1b the heating current as a function of time.

The diagrams shown in FIG. 1 serve to illustrate the basic principle of the present invention for operating a rapid heating device according to the present invention. As illustrated in FIG. 1a, it is desired that the temperature of the heating element rise rapidly after which it is held at a predetermined level. The heating power required to obtain this temperature behavior is illustrated in FIG. 1b. It will be seen that, during the initial heating phase, there is provided a constant heating current, while in the second heating phase, where the temperature remains nearly constant, the heating current is delivered as a series of pulses. There are thus two distinct time intervals during the heating process.

Figure 2:
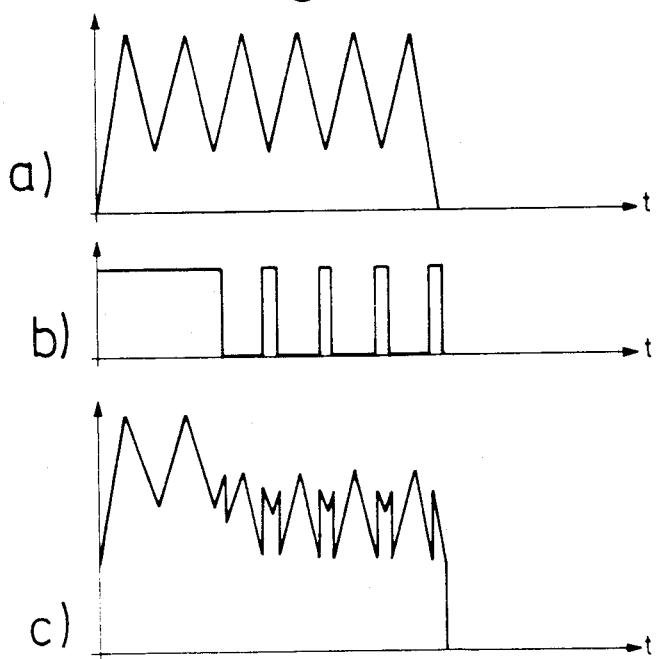
In FIG. 2a is shown a diagram illustrating the starter current as a function of time.
FIG. 2b shows the heater current as a function of time and FIG. 2c is a diagram of the overall battery current as a function of time.

It is easily understood that a rapidly acting heater requires a relatively high power. However, when such heaters are used in motor vehicles, care must be taken that the battery is not overloaded, especially during the engine starting process. It is thus desirable, as illustrated in FIG. 2, to synchronize the power pulses for the heater with the minima in the starter current of the engine. The cause of the cyclic variations in the starter current, as shown in FIG. 2a, is the periodically varying resistance of the engine to the starting effort, due to the compression which occurs in the various cylinders. If the occurrences of the heating current pulses are made to coincide with the minima in the starter current, as illustrated by the FIG. 2b, the total battery current will follow a curve illustrated in FIG. 2c. It will be appreciated that the overall current amplitude has been substantially leveled out.

Figure 3:
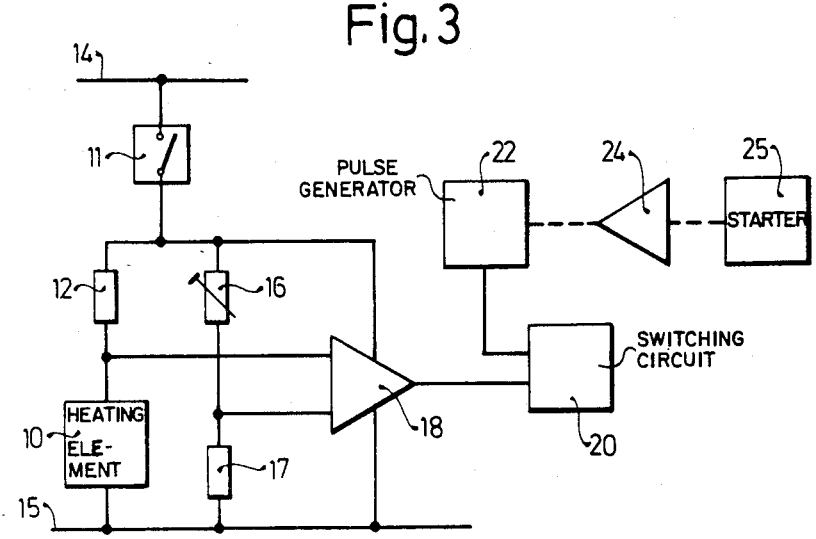
FIG. 3 is a block diagram of a first exemplary embodiment of the heating device of the present invention.

The block diagram of FIG. 3 which illustrates a first embodiment of the invention includes a heating element 10 and a switch 11. A measuring resistor 12 is connected between these two elements and the entire series connection is placed between the positive and negative poles 14 and 15, respectively, of a power source. Two bridge resistors 16 and 17 are placed in parallel with the measuring resistor 12 and the heating element 10. The junction of the heating element 10 and the resistor 12 is connected to one input of a comparator 18 while its other input is connected to the junction of resistors 16 and 17. The output of the comparator 18 is coupled to a switching circuit 20 which actuates the switch 11. A pulse generator 22 is also coupled into the switching circuit 20. The generator 22 may be a freely oscillating pulse generator or it may be synchronized by synchronizing pulses received from a comparator 24, as actuated by the starter 25.

The synchronization of the circuit may also take place on the basis of modulations in the supply current.

The rapid heating device illustrated in FIG. 3 operates as follows: The pulse generator 22 causes the switching circuit 20 to close the contact 11 for a short period of time, for example 10 ms. As a consequence, the bridge circuit consisting of resistors 16, 17, 12 and the heater element 10, as well as the comparator 18, are supplied with power and the output of the comparator 18 now holds the contact 11 closed until such time as the increasing temperature of the heating element 10 has caused the bridge to be balanced. At that point, the circuit 20 causes the switch 11 to be turned on and off at the frequency of the output signal from the generator 22. This output signal may be independent of the starter current or it may be synchronized therewith. It is also possible to change the width of the output pulse from the generator 22. The comparator 18 is supplied with power preferably from a point of the switch 11 remote from the positive supply line 14.

The circuit illustrated in FIG. 3 makes it possible to terminate all heating intervals in exact dependence on the temperature of the heating element provided that the resistance of the heating element 10 is a clear function of its temperature. It is worth noting that the resistance of the measuring resistor 12 is in the range of approximately 0.004 ohm, which holds resistive losses therein to extremely low values.

Figure 4:
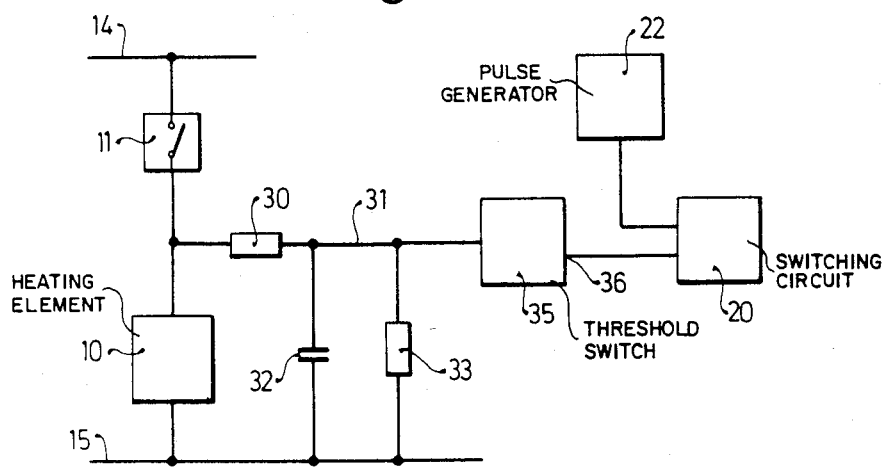
FIG. 4 is a block diagram of a second exemplary embodiment of the heating device according to the invention.

A second exemplary embodiment of the rapid heating device of the invention is illustrated in FIG. 4 in which the thermal behavior of the heating element 10 is simulated electrically by means of RC elements. An advantage of the embodiment of FIG. 4 is the absence of the measuring resistor 12 used in the embodiment of FIG. 3. In the embodiment of FIG. 4, a switch 11 and a heating element 10 is connected between the power lines 14 and 15. Their junction is connected via a resistor 30 with a line 31 from which a capacitor 32 and a resistor 33 are connected to ground. Also connected to the line 31 is a threshold switch 35 whose output 36 goes to the previously mentioned switching circuit 20.

The closing of the switch 11 initiates the first heating interval in which the heating element 10 is heated very rapidly. At the same time, the capacitor 32 is charged at a rate depending on the values of the resistors 30 and 33 and the magnitude of the capacitor 32 itself. When the voltage across the capacitor 32 on line 31 exceeds a certain value, the threshold switch 35 responds and causes the switching circuit 20 to initiate the pulsed operation characteristic of the second heating interval. The resistor 33 connected in parallel with the capacitor 32 serves to simulate the cooling of the heating element. Accordingly, this embodiment of the rapid heating device of the invention requires an exact calibration with the heating element 10 so as to permit exact simulation of its thermal behavior.

Figure 5:
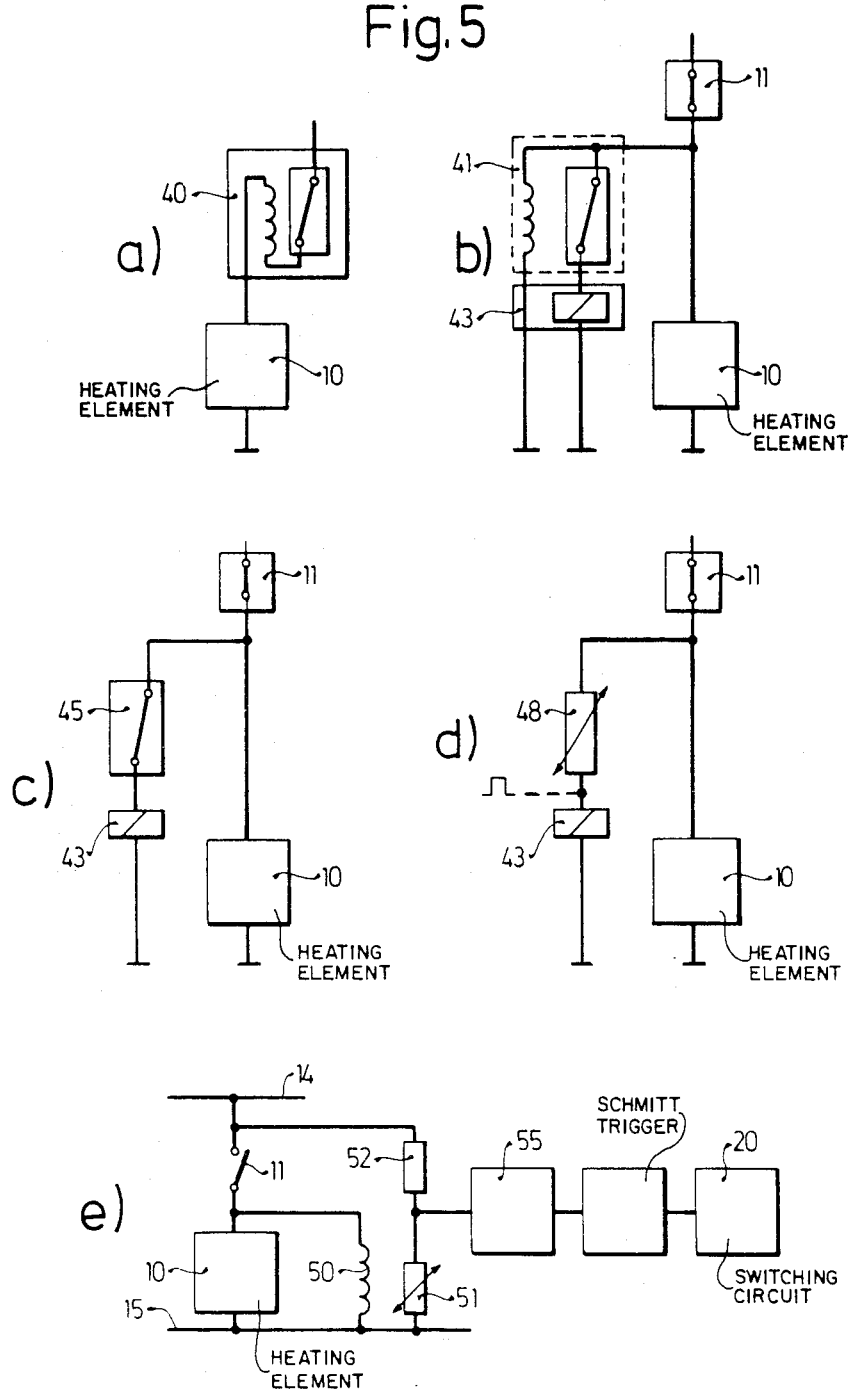
FIG. 5 illustrates five different variants for operating the heater according to the invention.

FIG. 5 illustrates a number of variants of a simplified rapid heating device according to the present invention. In FIG. 5a there is shown a rapid heating device in which the heating element 10 is connected in series with a bimetallic switch 40. In the bimetallic switch 40, the heating coil and the switch are connected in series and the switch is normally closed. Thus when heating current has been flowing for a certain period of time, the switch opens, the current is interrupted so that the switch cools down and recloses electrically. The power used within the bimetallic switch 40 is lost as heating power for the element 10 however. A modified embodiment is shown in FIG. 5b. In this circuit, the heating coil and the switch within the bimetallic switch 41 are connected in parallel and the switch itself is connected in series with a relay 43 which actuates the switch 11. The bimetallic switch 41 is connected in parallel with the primary heating element 10.

A similar rapid heating device is shown in FIG. 5c which includes a switch actuated by an extensible wire switch 45. Here too, the primary element 10 is connected in parallel with the series connection of the extensible wire switch 45 and a relay 43 which actuates the switch 11.

A still further modification is shown in FIG. 5d where the primary heating element 10 is connected in series with a cold conductor 48 and a relay 43. The initially low resistance of the cold conductor 48 causes the relay 43 to be actuated. In this embodiment, a separate turn-on pulse must be provided to the relay 43.

Finally, FIG. 5e illustrates yet another possibility for embodying a rapid heating device. In this variant, a secondary heating coil 50 acts on a cold conductor 51. The cold conductor 51 is one resistor in a voltage divider having a further resistor 52 and connected between the sources of power 14 and 15. The voltage across the cold conductor 51 is fed to a Schmitt trigger 55 whose output signal engages the switching circuit 20 which, in turn, actuates the switch 11 connected in series with the primary heating element 10.

Figure 6:
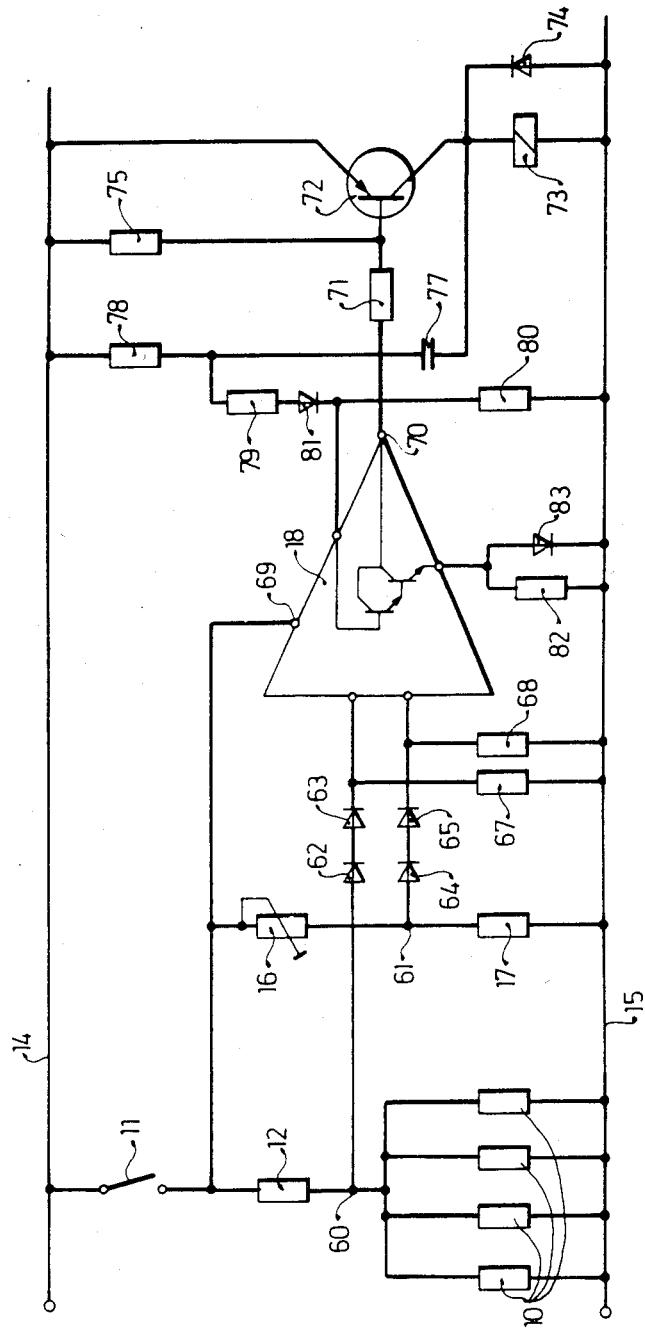
FIG. 6 is a detailed circuit diagram of the apparatus shown in FIG. 3.

FIG. 6 is a detailed circuit diagram of the embodiment illustrated in FIG. 3. It includes the previously mentioned bridge circuit consisting of the resistors 12, 16 and 17 and the primary heater consisting of four separate elements 10. In a particular example, the resistance of an individual element 10 may be approximately 40 mΩ while the measuring resistor 12 may have a value from 2 to 3 mΩ. The bridge circuit is connected in series with the switch 11 and provided with power via power supply lines 14 and 15. A junction point 60 is connected via diodes 62 and 63 to one of the inputs of the comparator 18 while the circuit point 61 is connected via diodes 64 and 65 to the other input of the comparator 18. Each of the inputs is connected to ground 15 via respective resistors 67 and 68. The positive power input 69 of the comparator 18 is connected to the junction of the switch 11 and the measuring resistor 12. The output 70 of the comparator 18 is connected via a resistor 71 to the base of a transistor 72 whose emitter is connected to the positive power bus 14 and whose collector is connected to the negative supply line 15 via the parallel connection of a relay 73 and a blocking diode 74. The base of the transistor 72 is connected to the positive supply rail 14 via a resistor 74 and its collector is connected to the positive supply line 14 via a capacitor 77 and a resistor 78. A voltage divider consisting of resistors 79 and 80 and a diode 81 is connected between the junction of the capacitor 77 and the resistor 78 on the one hand, and the negative supply line 15 on the other hand. Connected in parallel with the resistor 80 is the Darlington output stage of the comparator 18 connected in series with the parallel configuration of a resistor 82 and a diode 82 and a diode 83 connected in current-passing polarity.

The manner of operation of the rapid heating device illustrated in FIG. 6 is as follows:

When the positive bus 14 receives potential, the output 70 of the comparator 18 goes to a low voltage via the resistor 78 and the voltage divider consisting of the resistors 79 and 80. Accordingly, the transistor 72 is rendered conducting, the relay 73 is energized and the switch 11 is closed. Thus begins the first heating interval while at the same time the comparator 18 receives its supply voltage via the input 69. The presence of the diode 62-65 insures that the input voltages are below the supply voltage so as to insure the reliable operation of the comparator 18. As the heating elements 10 become warmer, the bridge approaches its balanced condition and when the diagonal voltage of the bridge and thus the differential voltage between the input contacts of the comparator 18 has become smaller than a given small value, the comparator output 70 switches to a positive signal. This signal blocks the transistor 72, causing the voltage across the relay 73 to drop so that the switch 11 re-opens while at the same time the voltage across the resistor 80 decreases. This causes the Darlington transistor stage of the comparator 18 to close so that the output signal of the comparator 18 drops and the transistor 72 again conducts, renewing the excitation of the relay 73 and re-closing the switch 11. While the switch 11 is open, the heating elements 10 were able to cool off and thus the bridge was unbalanced and when the switch is re-closed the measuring process begins anew.

A distinction between the circuit illustrated in FIG. 6 with respect to that shown in FIG. 3 is that in the circuit of FIG. 6, the comparator 18 and the generator 22 are not separate and independent elements but the circuit referred to as the comparator 18 is actually an integrated circuit, e.g. of the type TAA 865, which serves at the same time for pulse generation. It should be noted however that, depending on the resistance values of the resistors 78, 79 and 80, there is an automatic synchronization of the switch 11 with the undulations of the starter current because the undulations of the supply voltage on the line 14 actually cause the triggering of the switching processes in the circuit of FIG. 6.

Figure 7:
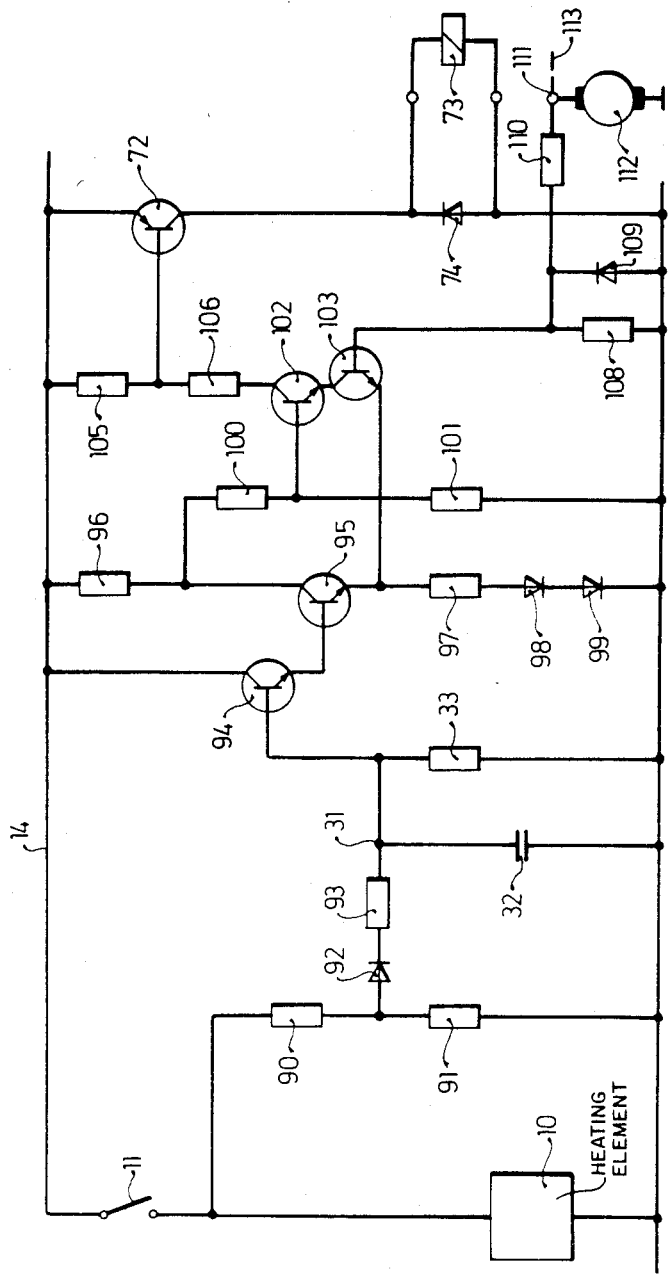
FIG. 7 is a detailed circuit diagram of the apparatus shown in FIG. 4.

A detailed circuit diagram of the embodiment of FIG. 4 is given in FIG. 7.

The switch 11 and the heater 10 are connected between the positive supply 14 and the negative supply line 15. Connected across the heater is a voltage divider consisting of resistors 90 and 91. The junction of these two resistors is connected via a diode 92 and a resistor 93 to the line 31 which is grounded via a capacitor 32 and is also connected to the base of a transistor 94 whose collector is attached to the positive supply line 14 and whose emitter goes to the base of a further transistor 95. The transistor 95 is part of a series connection of a resistor 96, a resistor 97 and two diodes 98 and 99 all connected between the positive and negative supply lines. The resistor 96 itself is a part of a voltage divider consisting of that resistor as well as the resistors 100 and 101, and the junction of the resistors 100 and 101 is joined to the base of a further transistor 102 connected in series with a fourth transistor 103. The emitter of the transistor 102 is connected via a resistor 106 and a resistor 105 to the positive line 14 while the base of the transistor 103 is connected via a resistor 108 to the negative line 15. A diode 109 is connected in blockage polarity across the resistor 108. The base of the transistor 103 is further connected via a resistor 110 to the positive side 111 of the engine starter 112. The starter 112 receives power via a line 113, not further shown.

The junction of resistors 105 and 106 is connected to the base of a transistor 72 whose emitter is connected directly to the positive line 14 and whose collector is connected via the parallel configuration of a relay 73 and a flow-blocking diode 74 to the negative line 15.

The circuit described above operates as follows:

When the circuit is energized, the voltage across the capacitor 32 is initially zero. Accordingly, both transistors 94 and 95 are blocked, causing conduction of the transistors 102 and 103. The current flowing through these transistors 102 and 103 lowers the voltage at the base of the transistor 72, causing the latter to conduct and to excite the relay 73 which now closes the switch 11. Accordingly, the first heating phase of the device is initiated while the capacitor 32 is charging. When the voltage on the capacitor 32 is sufficient to switch the transistor 94 into conduction, the latter causes the transistor 95 to conduct which blocks the subsequent transistors 102 and 103. As a consequence, the base voltage of the transistor 72 rises, causing transistor 72 to ultimately block and depriving the relay 73 of excitation current, thus causing the opening of the switch 11. The capacitor 32 now discharges through the resistor 33 until the transistor 94 again blocks and the entire process begins anew. By connecting the base of the transistor 103 to the positive power supply 111 of the starter 112, the undulations of the power supply voltage due to the operation of the starter cause a synchronization of the pulsed heater current with the undulations of the starter current.

The rapid heating devices described above make it possible to insure that a common heating element 10, which may be of any type whatever, can be rapidly brought to a predetermined nominal heating power which is maintained on the average thereafter while being supplied with pulsed current. In order to protect the heating element, it may also be provided that the temperature is actually reduced during the second pulsed time interval. Rapid heating devices such as described hereinabove may be used in motor vehicles, for example as glow heaters in engines with auto-ignition, so as to enhance and speed up the starting process. They may also be used to heat apparatus located in the exhaust system which requires a certain elevated temperature for proper operation. Such apparatus is, for example, the oxygen sensor and certain catalyzers. The rapid heating of these devices is required so as to permit controllers to regulate the engine operation to provide an exhaust gas free from noxious components.

The foregoing relates to preferred exemplary embodiments of the invention, it being understood that other embodiments and variants thereof are possible within the spirit and scope of the invention.

What is claimed and desired to be secured by Letters Patent of the United States is:

1. A control apparatus in a motor vehicle, comprising an electrically heated device;

a temperature simulating means having a resistor element connected in series with said device and an RC element connected in parallel with said device for generating a continuous simulated temperature signal over the course of the entire heating and cooling-down phase of said device and corresponding to variations in the actual temperature of said device as a result of a flow of electric current through said device;

a D.C. power supply means for supplying current to said device and said temperature simulating means;

a threshold switch for affecting the switching state of said heating device, connected to receive said simulated temperature signal, for generating a first output signal whenever the simulated output temperature signal exceeds a first predetermined value and for generating a second output signal whenever the simulated temperature signal falls below a second predetermined value; and current flow interrupting means, which is activated by said threshold switch output signal to intermittingly interrupt the flow of current to said device and said temperature simulation means from said electric power supply means, whereby said device is switched on an off in a closed-loop control in accordance with the temperature of said device.

2. An apparatus as defined in claim 1, wherein said means for simulating the temperature is an electronic means for retaining the simulated temperature at least for a given time.

3. An apparatus as defined by claim 1, wherein the heating process begins with the actuation of engine starting and terminates in dependence on operational variables and/or at a predetermined time subsequent to a starter actuation.

4. An apparatus according to claim 1, wherein said temperature simulating means is electronic and further includes a process circuit comprising resistors and series-connected transistors, and a resistor-diode network for rendering said circuit independent of operational voltage.

5. An apparatus as defined by claim 1, installed in self-igniting internal combustion engine as a glow heater.

6. An apparatus as defined by claim 1, installed in an internal combustion engine as a heater for the exhaust gas sensor.

7. An apparatus according to claim 1, wherein further, said first predetermined value equals said second predetermined value.

* * * * *